INVENTORS:
DUNCAN B. CUTLER
WILLIAM L. WARNER
WILLIAM A. HADDEN
BY
ATTORNEY

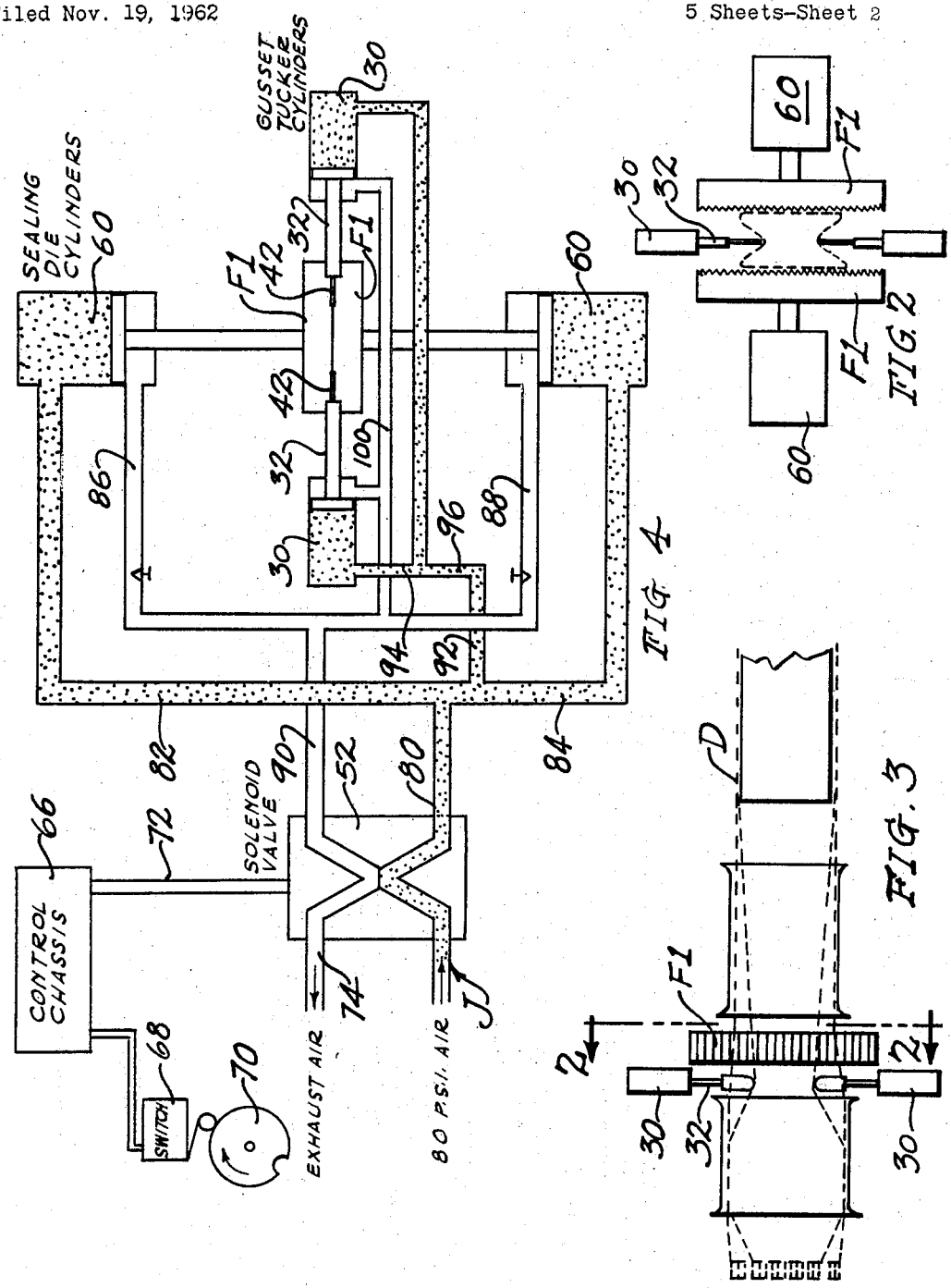

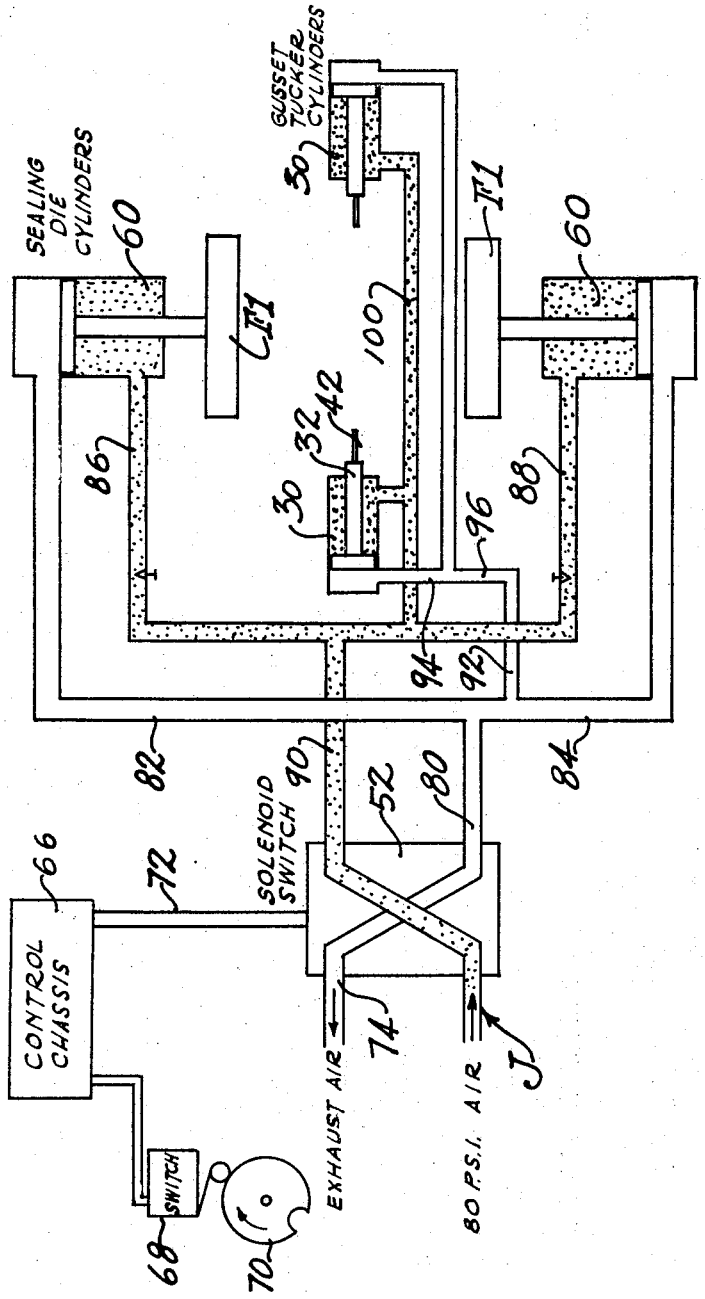

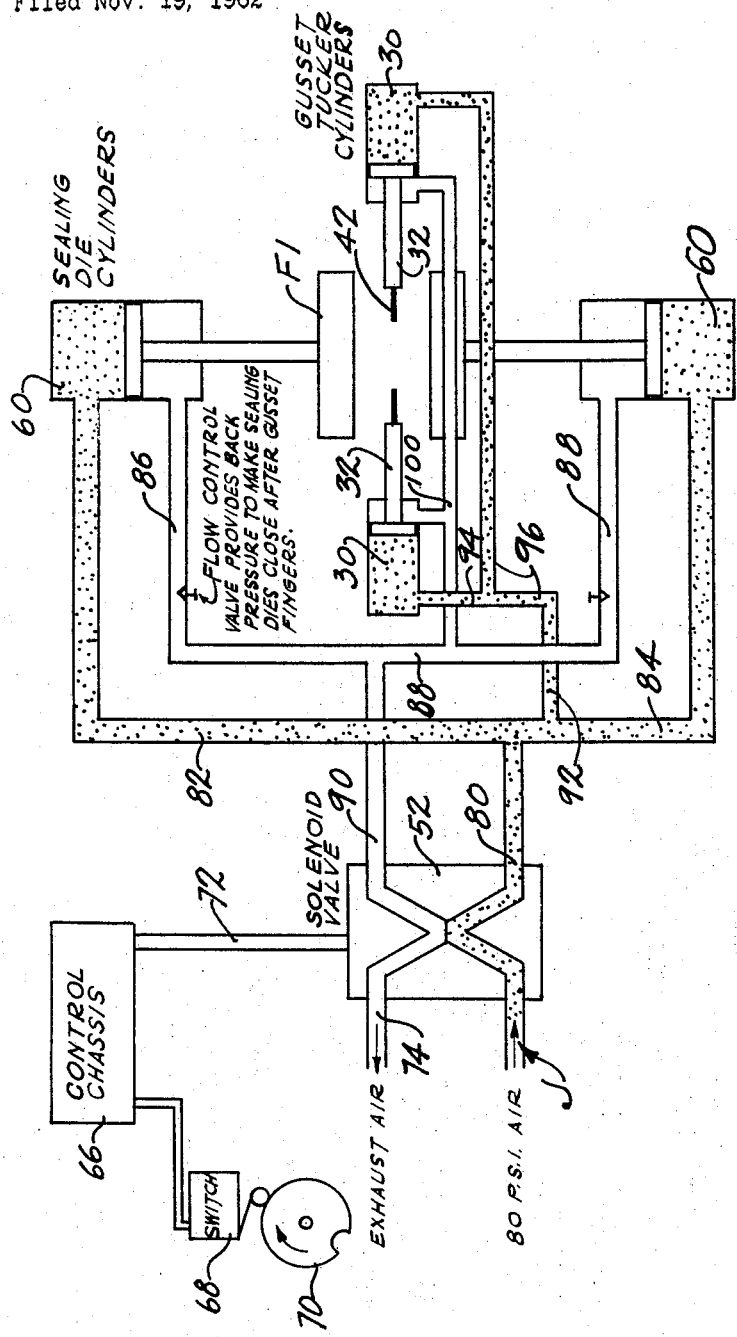

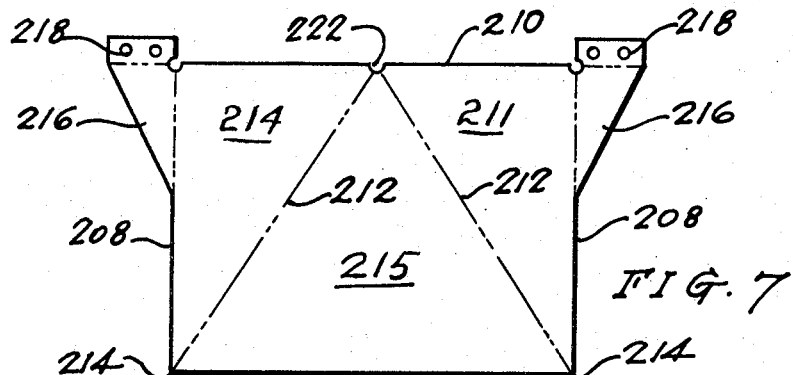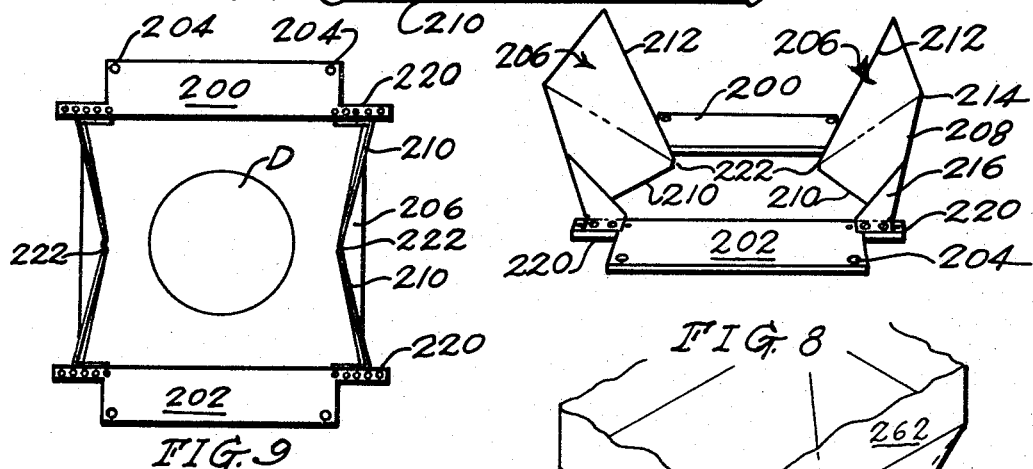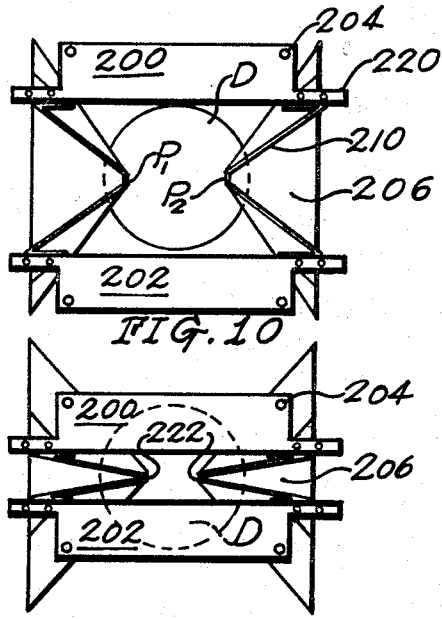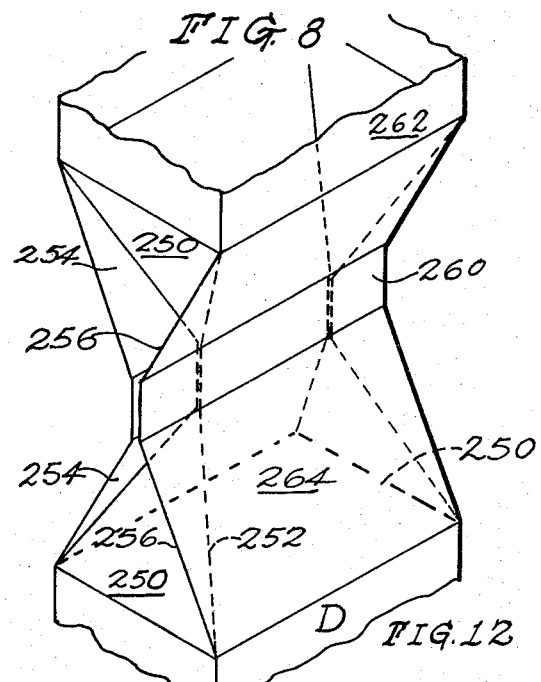

United States Patent Office 3,353,327
Patented Nov. 21, 1967

3,353,327
GUSSET APPARATUS FOR BAG FORM AND
FILL MACHINE AND METHOD
Duncan B. Cutler, William L. Warner, and William A. Hadden, De Kalb County, Ga., assignors to The Woodman Company, Inc., Decatur, Ga.
Filed Nov. 19, 1962, Ser. No. 239,205
14 Claims. (Cl. 53—28)

This invention relates to a gusset apparatus for a bag form and fill machine and method and particularly to the continuous forming of gussets in the top and bottom of bags which are formed and filled on an automatic, continuously feeding machine of the sort which feeds glassine, cellophane or the like from a sheet and forms the bag and fills the bag with potato chips or the like and separates the individual bags from each other.

Form and fill machines are well known in the art and the details and arrangement of the machine per se does not form a part of this invention except as an environment or a background for the application of the present method employing a particular embodiment of the apparatus. The machine shown in the present application is of the type which has a movable carriage that reciprocates from bottom to top and back again and on the downward motion of the carriage pulls an amount of film equal to the desired bag length, at the same time sealing and severing a completed bag from the subsequent bag by a cam actuated knife assembly. It may also be used on form and fill machines of the sort where the sealing dies and related structure remain fixed with respect to the frame of the machine but a mechanism is employed to pull the material upwardly and downwardly to create the bag length and to return the machine to initial position.

Generally described, in conjunction in the present embodiment with a form and fill machine having a movable carriage but without restriction on the scope of my invention or method, a conventional form and fill machine of the sort shown broadly in Stokes, U.S. 2,257,433 employs a machine frame having means for delivering a continuous web of glassine, cellophane, plastic material or the like and to draw same over a forming collar where it is formed into a cylinder, the overlapping edges of which are sealed by a heat sealing bar. The cylinder extends through a reciprocating carriage and heat sealing dies close on the film in conjunction with downward motion of a carriage which pulls an amount of film equal to the desired bag length at the same time sealing and severing the completed bags from the subsequent bag by a cam actuated knife assembly. As the carriage moves back to initial position, the sealing jaws are open. Other machines which can be readily adapted to employ the method taught by the present disclosure and to incorporate similar apparatus are shown in U.S. Patents Nos. 2,899,875, 2,969,627, 3,027,695. Since it is desirable to place gussets on the ends of these bags for the sake of neatness, accuracy of closing and sealing and other reasons, according to the present invention a method is disclosed whereby upon the carriage reaching the top of its stroke tucker-blades extend against the sides of the film tube just prior to the closing of the sealing dies. The tucker-blades remain extended, as the sealing dies close, to indent the side of the film cylinder which causes the sealed end of the bags to take what is commonly called a gusset-shape. Because this indent or gusset extends up through the sealing dies and the knife mechanism cuts through the center of the sealing dies, both the top of the completed bag and the bottom of the subsequent bag receive the gusset shape. As the carriage moves back up to close upon the tube of material again to form a completed bag, the tucker-blades are retracted by air cylinders, thereafter repeating the cycle just previously described.

An object of this invention is to provide a method for forming gussets on bags which are made continuously on a form and fill machine.

A further object of this invention is to provide a method for forming gussets on bags which are formed on a form and fill machine by tucking the material on both sides before the tube of material is severed so that the tuck extends from the top of the bag being formed through the bottom of the bag next successive thereto whereby upon severing the bottom bag from the top bag the gusset is formed in both of said bags.

Another object of this invention resides in one apparatus comprising gusset-tucker fingers actuated on the carriage of a movable carriage form and fill machine to close upon the tube of material just prior to the closing of the sealing dies and to remain until the sealing jaws have completed the holding of the material with the gusset formation therein.

Still another object of this invention, in conjunction with the form and fill machine employing a movable carriage, resides in the use of air or fluid actuated hydraulic cylinders which are operated off of the air or hydraulic system of the machine itself to operate the gusset-tucker fingers which may be electrically controlled in a pre-set cycle.

A further object of this invention resides in the use of hydraulic or air operated controls for the gusset-tucker fingers which are electrically operated and so arranged that by operating the gusset-tucker fingers relatively fast with respect to the sealing die both sets of controls for the gusset-tuckers and the sealing dies can be controlled from the same control valve.

Other and further objects and advantages of our invention will become apparent upon reading the following specification taken in conjunction with the accompanying drawings, in which:

FIG. 2 is a diagrammatic top plan view of the relationship of the heat sealing dies and gusset-tucker fingers of the present invention on the machine shown in FIG. 1.

FIG. 3 is a diagrammatic side elevation view of the diagram shown in FIG. 2 illustrating the relationship between the heat sealing dies and the gusset-tucker fingers.

FIG. 4 is a control diagram showing the elements in the position of the carriage moving downwardly and with all sealing die and gusset-tucker cylinders extended, pulling a bag.

FIG. 5 is a control diagram the same as that shown in FIG. 4 but with the carriage moving up and all sealing die and gusset-tucker cylinders retracted.

FIG. 6 is a control diagram the same as FIGS. 4 and 5 but illustrating the condition which exists when the carriage is at top dead center and the gusset cylinders are substantially extended to complete the gusset while the sealing die cylinders are moving out to seal and close on the film.

FIG. 7 is a top plan view of the tucking member of a different form of the present invention.

FIG. 8 is a perspective view of a pair of the members shown in FIG. 7 mounted on adapters for both of the heat sealing jaws.

FIG. 9 is a top plan view looking down through a tube of formed material with the tucking members of FIGS. 7 and 8 in inoperative position about to close to the position shown in FIG. 10.

FIG. 10 is a view the same as FIG. 9 but with the tucking members moved into engagement with opposite sides of the tube of material.

FIG. 11 is a view similar to that shown in FIG. 10 but with the tucking members moved approximately to the substantially ultimate position as the heat sealing jaws close.

FIG. 12 is a perspective view of a top of one bag and bottom of the bag thereabove formed from a cylinder into a semi-rectangle by the embodiment shown in FIGS. 7 through 11, inclusive.

Figure 1:
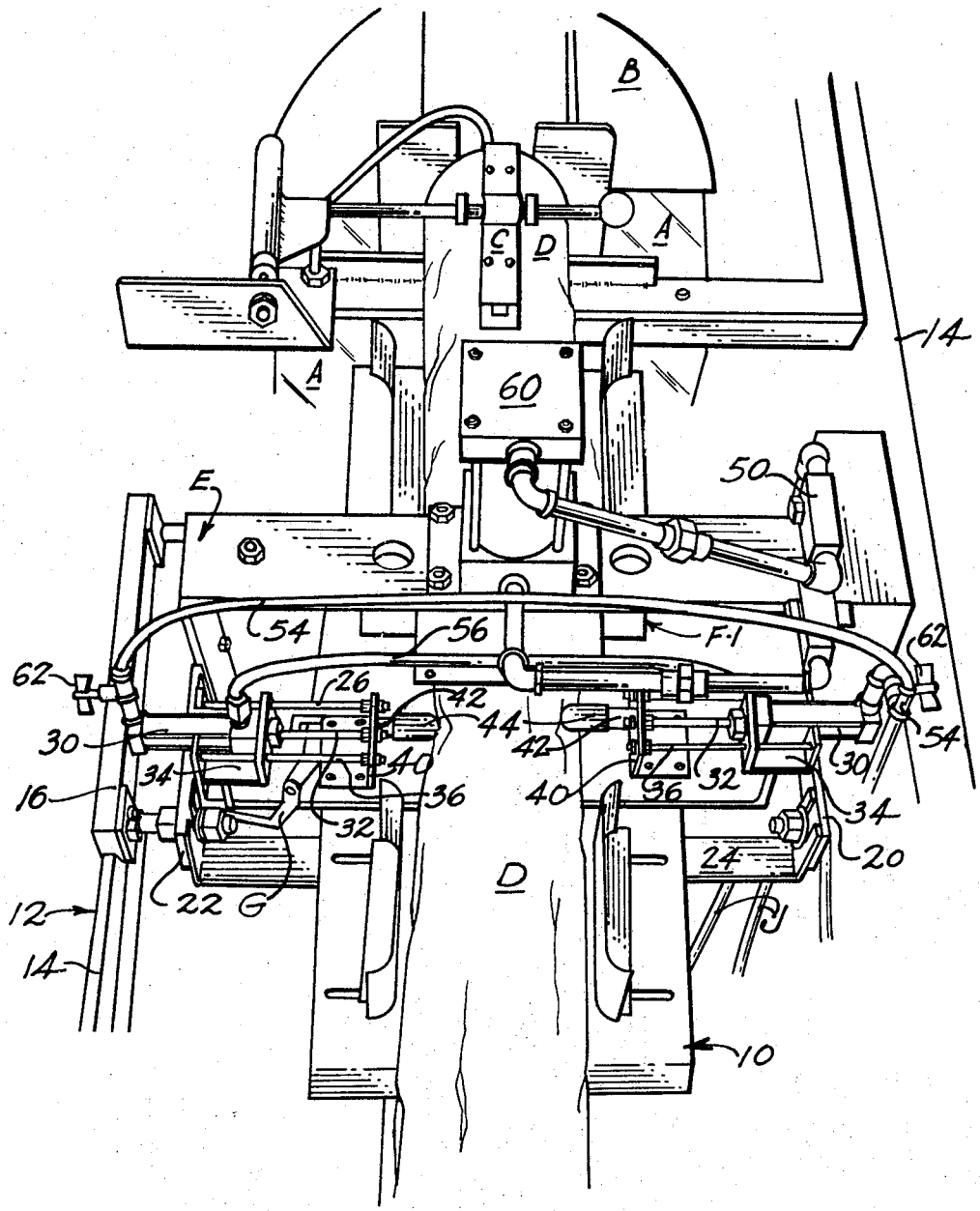
FIG. 1 is a perspective view looking from the floor upwardly onto one side of a typical form and fill machine of the movable carriage type and having gusset-tucker apparatus of the present invention mounted on the carriage.

As stated in the introductory portion of this specification, form and fill machines are well known in the art and have been developed to a point of accurate automatic operation employing in different machines various details. It is contemplated that the present method may be employed on many of the present form and fill machines and that the present apparatus may be applied or adapted to be applied to any form and fill machine of the sort which employs a carriage moving upwardly and downwardly with respect to a tube of material formed from a sheet on the machine to close on the tube and pull same a bag's length and then to return to initial position. At the time the heat sealing dies are about to close on the tube to make the final seal between the lowermost bag top and the next successive upper bag bottom the gusset forming or tucker-fingers disclosed by the present specification are moved into position against opposite sides of the tube to tuck the tube to form a gusset on each side extending from the top portion of one bag through the bottom portion of the other bag so that the heat sealing die closes on both the top and bottom having a gusset formed therein.

By way of general environment and background material, a form and fill machine of the type discussed previously and designated generally by number 10 comprises a frame 12 having inclined spaced and opposed tracks 14. While a typical form and fill machine of this sort normally employs two form and fill apparatus side by side on one frame and being out of phase with each other 180° (that is, when one is up the other is down) driven by roller chains connected to a motor driven crank shaft in the base of the machine, this structure is not particularly shown or emphasized in the present drawings and for the purposes of disclosure and discussion it is sufficient to refer to the one side shown in FIG. 1. Mounted on tracks 14 on nylon runners 16 is a carriage or carriage framework E. A continuous web of glassine, cellophane or the like A is supplied from a supply roll (not shown) and as it is drawn over a forming collar B and sealed by bar C to form a long tube or cylinder D which extends through and inside of the reciprocating carriage assembly E. Opposed, heated sealing dies F1, spaced on opposite sides of the tube D, are actuated by a mechanism to close on the film when the carriage is at the top position. Then the carriage moves downwardly to pull an amount of film of tube equal to the desired bag length, at the same time sealing and severing the completed bag by a cam actuated knife assembly G employing a sharp knife substantially in the middle of the heat sealing dies F1. As the carriage E moves back up to its initial and top position, the heat sealing jaws are open. The above described machine arrangement is conventional structure and does not per se form any part of this invention.

Mounted on plates 20, 22 attached to a transverse plate 24 on carriage E is a pair of gusset-tucker air cylinder devices 26 of identical construction and being located on opposite sides of the tube D. Each of the air cylinder devices comprises a cylinder 30 having a piston 32 therein. Cylinder 30 has attached to the front thereof a bracket member 34 having spaced support rods 36 supporting a second and outward L-shape bracket member 40 to which the outer end of piston 32 is attached. A gusset-tucker finger 42 of flat construction has one end attached to the L-shape bracket and the outer end protruding inwardly towards the side of the tube D and being covered by a smooth plastic tip 44 which is adapted to engage the side of the glassine or cellophane bag. As is readily seen in FIG. 1, gusset-tucker fingers 42 are opposed with respect to each other on opposite sides of the tube D and are located, as will also appear from FIGS. 2 and 3, beneath and to extend into the space between the opposed heat sealing jaws F1.

The main flow control arrangement for the heat sealing dies F1 are designated by the reference numeral 50 and in conjunction with the valve arrangement there is a solenoid control valve 52. Leading from solenoid valve 52 is an air line 54 leading into one cylinder 30 and from cylinder 30 a line 56 leading to the other cylinder 30. Main air supply to the machine is supplied through air lines J from the base of the machine 10. Control valve 52 is electrically operated in a pre-set cycle to operate the sealing dies and the rate of closure of the sealing dies F1 is regulated by the flow control valves 50. By operating the gusset-tucker cylinders 30 relatively fast with respect to the sealing die cylinders 60, both sets of gusset-tucker cylinders 30 can be controlled from the same control valve 52. By closing a small needle valve 62 leading to the gusset-tucker cylinders 30, action of the gusset-tucker fingers 42 may be stopped thereby allowing the machine to make flat (ungussetted) bags in the conventional manner.

In the diagram shown in FIG. 4, the electrical operation of the control chassis arrangement 66 is operated from various micro switches 68 contacted by switch actuating member 70 located at strategic positions on the machine. Control chassis 66 electrically connects by line 72 with the solenoid operated control valve 52 to which leads air typically in the amount of 80 pounds per square inch through supply line J and from which the air is exhausted through an exhaust line 74. In the position of FIG. 4, the carriage has started to move down and all cylinders are extended and the tube D is being pulled to form a bag length. Air pressure in the respective lines is shown in the darker areas and exhaust air is represented by the open lines with no shading or darkened area therein. It is apparent from the condition shown in FIG. 4 that air pressure is applied to all of the cylinders, the sealing die cylinder 60 and the gusset-tucker cylinders 30.

Upon reaching the maximum lowermost reach of the stroke by carriage E with the sealing die cylinders 60 and gusset-tucker cylinders 30 closed in the manner of FIG. 4, the knife is actuated by actuating mechanism G and the bottom bag which has been formed and filled is cut and dropped off and the bottom of the next bag still a part of the continuous tube D has been formed with a gusset simultaneously with the forming and cutting of the top of the severed bag.

As the carriage E moves back up, the jaws F1 are open and the tucker-blades 42 are retracted in the manner shown in FIG. 5. In this position, the carriage E is free to move back up to initial position and upon reaching the uppermost top position the carriage E is at top dead center in the manner shown in FIG. 6, and the gusset cylinders 30 are extended ahead of the closing of the sealing die cylinders 60 which are moving out to seal on the bag in the position shown in FIG. 4. It is pointed out that in connection with FIGS. 4, 5, and 6 the main air is supplied through an air line 80 from incoming air supply line J and branch lines 82, 84 supply the main air to sealing die cylinders 60. Sealing die cylinders 60 are provided with exhaust lines 86, 88 connected through a common line 90 with the flow control valve 52 which controls the back pressure in lines 86, 88 so as to cause the sealing die cylinders to close slowly in a manner which may be determined and pre-set according to the desired operation of the machine. Air from main line 80 is supplied to the gusset-tucker cylinders 30 by means of a supply line 92 having branch lines 94, 96 to the respective cylinders. Exhaust air from cylinders 30 passes from the scope of our invention as defined in the appended claims.

We claim:

1. In a method for forming gussets on bags continuously made on a form and fill machine which includes heat sealing dies for sealing the tops and bottoms of the bags, comprising:
   (a) forming the bag from a continuously supplied tube of material,
   (b) sealing the bag by a pair of heat sealing dies moving from opposite sides of the tube,
   (c) prior to closing said heat sealing dies, forming tucked portions on opposite sides of said tube from the open space between said dies by extending finger members into the opposite sides of said tube at the opposite open ends of said sealing dies,
   (d) and tucking said bag on said opposed sides for a distance above said sealing dies sufficient to extend from the top of the bottom bag being sealed and severed and below said sealing dies to the bottom of the top bag yet to be severed from the tube and sealed.

2. In a gusset forming method for forming gussets on bags continuously made from sheet film formed into a tube on a form and fill machine and wherein said machine includes means for sealing the sheet edges to form the tube and heat sealing dies closing on each other thereby sealing the tops and bottoms of the bags, comprising:
   (a) forming the bag from a continuously supplied tube,
   (b) sealing the bag by the heat sealing dies moving from opposite sides of the tube,
   (c) prior to closing said heat sealing dies, forming tucked portions on opposite sides of said tube from the open space between said dies by extending tucker fingers into the opposite sides of said tube,
   (d) and tucking said bag and maintaining said tuck with said fingers on said opposed sides for a distance sufficient to extend from the top of the bottom bag being sealed and severed to the bottom of the top bag yet to be severed from the tube and sealed, and,
   (e) closing said sealing dies on said tucked portions to permanently seal same on said bag.

3. In a gusset forming method for forming gussets on bags continuously made on form and fill machines and wherein said machine includes heat sealing dies for sealing the tops and bottoms of the bags and cutting means for separating bags, comprising:
   (a) forming the bag from a continuously supplied tube,
   (b) simultaneously sealing the top of one bag and bottom of another bag by a pair of heat sealing dies moving from opposite sides of the tube,
   (c) prior to closing said heat sealing dies, forming gusset portions on opposite sides of said tube from the direction of the open spaces between each end of said dies by extending a means into the opposite sides of said tube to contact the tube and fold a gusset portion prior to said dies closing, and
   (d) maintaining said gusset fold on said bags on said opposed sides for a distance sufficient to form a gusset and to extend from the top of the bottom bag being sealed and severed to the bottom of the top bag yet to be sealed at its top and severed from the tube.

4. In a gusset forming method for forming gussets on bags continuously made on form and fill machines on which a continuous bag-tube is made and wherein said machine includes a pair of heat sealing dies for sealing along the tube at intervals to make the tops and bottoms of the bags, comprising:
   (a) forming the bag from the continuously supplied tube,
   (b) sealing the bag by the pair of heat sealing dies moving from opposite sides of the tube,
   (c) prior to closing said heat sealing dies, forming gusset portions on opposite sides of said tube from the open space between said dies by extending a folding gusset-former into the opposite sides of said tube and extending said folding gusset-forming members closer to each other as said dies are closing,
   (d) maintaining said fold on said bag on said opposed sides for a distance sufficient to form a gusset and to extend from the top of the bottom bag being sealed and severed to the bottom of the top bag yet to be sealed at its top and severed from the tube as said dies close on said tube to seal thereacross and to seal-in said gussets.

5. In a gusset forming method for forming gussets on bags continuously made on form and fill machines and wherein said machine includes heat sealing dies for sealing the tops and bottoms of the bags and means for cutting the bags apart, comprising:
   (a) forming the bag from the continuously supplied tube,
   (b) sealing the bag by a pair of heat sealing dies moving from opposite sides of the tube,
   (c) prior to closing said heat sealing dies, forming indented portions on opposite sides of said tube from the open space between said dies by extending a deformable plastic material into the opposite sides of said tube in response to the pressure of said dies on said material,
   (d) indenting said bag on said opposed sides by said plastic material for a distance sufficient to extend from the top of the bottom bag being sealed and severed to the bottom of the top bag yet to be severed from the tube and sealed, and maintaining said indention while said dies close until said indention is a permanent part of said bag and which is sealed in place.

6. In a gusset forming method for forming gussets on bags continuously made on said machines and wherein said machine includes heat sealing dies for sealing the tops and bottoms of the bags, comprising:
   (a) forming the bag from a continuously supplied tube,
   (b) sealing the bag by a pair of heat sealing dies moving from opposite sides of the tube,
   (c) just prior to closing said heat sealing dies, forming gusset portions on opposite sides of said tube from the open space between said dies by extending a deformable plastic gusset-forming member caused to deform between said dies,
   (d) folding said bag on said opposed sides by said deformable member for a distance sufficient to form a gusset and to extend from the top of the bottom bag being sealed and severed to the bottom of the top bag yet to be sealed at its top and severed from the tube, and
   (e) maintaining said gussets until said dies seal same into place.

7. In an apparatus for forming gussets on a form and fill machine wherein said machine includes a former and sealer for forming a continuously supplied web of film material into a tubular formation, and means for moving heat sealing jaws with sealing dies onto opposite sides of said tube to seal an area across said tube and means for cutting said bag apart; and also having means for moving said tube and said die relative to each other to move from the bottom seal of the bag to the top seal of the bag at the bottom of the next successive bag, comprising:
   (a) opposed gusset forming apparatus on opposite sides of said tube between said heat sealing jaws and opposing each other on opposite sides of said tube to move against opposite sides of said tube from said sealing jaws,
   (b) said apparatus gusset-fold members extending between said jaws on opposite ends thereof to be closed by and with said jaws,
   (c) each of said gusset-fold members having relatively through an exhaust line 100 leading into the exhaust line 88 from cylinder 60 through line 86. According to this arrangement, pressure supplied to gusset-tucker cylinders 30 may be rather rapid as opposed to the pressure effect on sealing die cylinders 60 so that the gusset-tucker cylinders may be operated from the same control valve 52 as the sealing die cylinders 60.

In the embodiment shown in FIGS. 7 through 12, inclusive, the air cylinder devices 26 and required mechanism associated therewith has been eliminated. The heat sealing jaw members F1, spaced on opposite sides of the tube D, operate in the same manner and the basic operation of the form and fill machines as discussed in the preceding portion of this specification has not been altered. A pair of adapter plates 200, 202 are provided with screw holes 204 by means of which, with suitable screws, they may be attached to the under portion of the heat sealing jaws F1. According to this arrangement, the adapters 200, 202 substantially become a permanent part of the respective opposed jaws F1 and open and close exactly therewith and in response thereto.

In FIG. 7 there is shown a plastic embodiment of the present form of the invention comprising a piece of preformed plastic 206 preferably made from that plastic known as polypropylene. The rectangular piece of plastic 206 with sides 208 and longitudinal edges 210 is deformed to form hinge lines 212 extending from one corner 214 on each side of the material 206 to a point approximately midway along the opposite edge 210. It is a characteristic of the plastic polypropylene that a sharp break or line along the line 212 creates a permanent hinge which rather than weakening upon bending appears from its molecular construction to become stronger or at least to maintain its strength throughout hundreds or perhaps even thousands upon thousands of subsequent bends. Edges 208 are preformed into bracket portions or tabs 216 which are provided with screw holes 218 through which the tabs 216 are attached to corresponding portions 220 formed on the adapter plates 200, 202. According to this construction, an apex 222 is formed on the member 206 and this apex points downwardly and is located in such manner as to protrude inwardly between the jaws and the adapter plates 200, 202.

As readily seen in the perspective view of FIG. 8, the apexes 222 of the pair of gusset forming members 206 normally extend into the space between the paths of adapters 200, 202 which are in the same position as the jaws F1 to which they are attached. Closing the opposed jaws F1, and the adapters 200, 202, toward each other to reduce the distance therebetween, with the side tabs 216 of each of the formers 206 fastened to a respective adapter 200, 202, causes the apexes to move inwardly toward each other and the entire respective formers 206 to bend about their hinge lines 212.

It is to be understood that the device just described may be made from other materials, plastic, metal or otherwise, and that the hinge lines and hinges can be actual mechanical hinges, re-inforced fabric or other types of hinges.

The operation of the formers or gusset tuckers of the embodiment of FIG. 7 may be further understood by reference to the sequential FIGURES 9, 10 and 11. In FIG. 9 the tube of material D is between the jaws F1 and the respective adapters 200, 202. Apexes 222 are spaced outwardly from the tube D and do not touch same in the open position of the jaws F1. However, as the jaws F1 (and adapters 200, 202) move to a closer position on each other, the formers 206 engage the opposite sides of tube D at positions P1, P2 to dent in the opposite sides of the tube. As the jaws F1 close upon each other to make the seal, the formers continue to bend about their respective hinge lines 212 and the apexes of the formers 222 move to their ultimate position inwardly from opposite sides of tube D. Thus, a gusset-fold is formed on opposite sides of the bags being formed and the gusset-fold extends from below the seal to the top of the bag below and above the seal to the bottom of bag above.

For purpose of the present specification, the jaws F1 and respective adapters 200, 202 are considered the same since the adapters 200, 202 are rigidly attached to the respective jaws 200, 202 and move therewith.

It is to be noted that the gusset arrangement formed by the embodiment shown in FIGS. 7 through 11, inclusive, is not identical to that formed by the fingers 44 in the previous embodiment. The tubular film or material D is caused to be transformed from a cylindrical or near cylindrical or elliptical shape into a semi-rectangle at the bottom of the top bag and the top of the bottom bag by the motion of the members 206 as their apexes 222 cause the film to assume more definite and more even proportions and angles than that which is obtained by the fingers 44 in the preceding embodiment.

With reference to the package formed in FIG. 12 for purpose of discussion it may be assumed that the faces such as face 211, of the folding elements 206 correspond with portions of the package material itself. Specifically, the package portion 250 is formed by the face 215 of the element 206 as it moves from the position shown in FIG. 9 to the position shown in FIG. 11 defining by the lines 212 the corresponding lines 252 of the portion 250. Two triangular portions 254, 256 are formed in conjunction with portion 250 in the gusset of the film D by the faces 214 on opposite sides of the intersecting lines 212. It is to be noted that this is a positive folding action and the faces 214, 215 constantly define the shape and extent of the folds and portions 250, 254 from the time the apex 222 engages the opposite sides of the film D until, as seen in FIG. 11, the ultimate position of the gusset fold is reached.

Since the jaws 200, 202 are closing upon the film D towards a portion designated in FIG. 12 as the "seal area" and represented by number 260, a "reflection" or "counterpart" on the bottom of the top bag 262 is created above the seal area 260 from the top of the bottom bag 264. This reversed construction on the bottom of bag 262 contains the same definite conformity and accurate folded gusset arrangement as found in the top of bag 264 including a corresponding face 250 and faces 254, 256. The type of gusset formed by this action on each of the bags 262, 264 is similar to the common type of gusset found in some waxed milk cartons.

The two opposing elements 206 between the jaws 200, 202, form identical folded gussets on opposite sides of the tube D on each of the bags 262, 264 in the manner shown in FIG. 12 and each of the gussets formed has the face 250, and the other triangular faces 254, 256 to complete a neat and fairly accurately formed gusset closed and completed by the action of the sealing jaws 200, 202 completing the seal area 260. This gusset is neater, more accurate, more predictable and more consistent in formation than the gusset formed by the fingers 44.

The action of the straight jaws 200, 202 closing from opposite sides along straight lines repersented by the face of the respective jaws and the elements 206 folding about straight lines 212 and edges 208, 210 transforms the cylindrical or elliptical shape of the tube D into straight line geometrical shapes represented substantially as a semi-rectangle folded into tucked, triangular portions 250, 254 forming the gusset completed by the seal area 260.

While we have shown and described a particular embodiment of our invention together with suggested modifications thereof and a separate embodiment, this is to enable one skilled in the art to construct a typical device and is not to be construed as any sort of limitation on the scope or coverage of our invention as various modifications, alterations, substitutions, changes, deviations, rearrangements, and ramifications may be made in the embodiments shown and described herein without departing movable portions each comprising flat sheets of plastic or the like that are moved by said jaws to extend said gusset-fold members into said tube prior to the closing of said jaws.

8. In an apparatus for forming gussets on a form and fill machine wherein said machine includes a former and sealer for forming a continuously supplied web of film material into a tubular formation, means for moving heat sealing jaws with sealing dies onto opposite sides of said tube to seal an area across said tube and means for cutting said bag apart; and also having means for moving said tube and said die relative to each other to move from the bottom seal of the bag to the top seal of the bag at the bottom of the next successive bag, comprising:
 (a) opposed gusset forming apparatus on opposite sides of said tube between said heat sealing jaws and opposing each other on opposite sides of said tube from a direction opposite from said sealing jaws,
 (b) said apparatus including gusset-fold members extending between and attached to said jaws on each of opposite ends thereof to close by and with said jaws,
 (c) said gusset-fold members having hinged portions defining a triangular center portion and side portions foldable relative to each other about said hinge line as said jaws close said gusset-fold members.

9. In an apparatus for forming gussets on a form and fill machine wherein said machine includes a former and sealer for forming and sealing a continuously supplied web of material into a tubular formation and for moving heat sealing dies onto opposite sides of said tube to seal an area across said tube, means for separating said bags, and also having means for moving said tube and said die relative to each other to move from the bottom seal of one bag to the top seal of that same bag and the bottom of the next successive bag, comprising:
 (a) opposed gusset-forming means on opposite sides of said tube between said heat sealing dies and opposing each other on opposite sides of said tube from a direction to move substantially along the plane of the face of said sealing dies as they close to seal,
 (b) said means in (a) including gusset-tucker fold members between the closing of said dies to be actuated by the jaws as they close on each other,
 (c) each of said fold members comprising a sheet of deformable material of substantially quadrilateral construction having diagonal hinge lines thereon defining a center triangular fold face and side fold-faces,
 (d) said side fold faces and said center fold faces moving relative to each other and closing with respect to the side and center faces on the opposite side, as said dies close, thereby,
 (e) to create a center tucked gusset-fold with folded sides on each side of the bag substantially folded on the material itself, said center fold being substantially flat and extending inwardly into said bag.

10. In an apparatus for forming gussets on a form and fill machine wherein said machine includes a former for forming a continuously supplied web of material into a tubular formation and for moving heat sealing dies onto opposite sides of said tube to seal an area across said tube and also having means for moving said tube and said die relative to each other to move from the bottom seal of the bag to the top seal of the bag at the bottom of the next successive bag, comprising:
 (a) opposed gusset-forming control apparatus on opposite sides of said tube between said heat sealing dies and opposing each other on opposite sides of said tube from a direction opposite from said sealing dies,
 (b) gusset-tucker members connected to said apparatus and actuated thereby to engage sides of said tube,
 (c) an air control valve on said machine controlling air supply for operation of said heat sealing dies,
 (d) an air line leading to each of said gusset-tucker control apparatus from said air control,
 (e) an air cylinder for each of said dies,
 (f) an air line for each cylinder in (e),
 (g) exhaust means for said air line and
 (h) control means for (g) wherein the exhaust pressure and speed of exhaust is adjusted to delay the closing of said dies until the gusset-forming members have engaged said tube.

11. In an apparatus for forming gussets on a form and fill machine wherein said machine includes a former and sealer for forming and sealing a continuously supplied web of material into a tubular formation and for moving heat sealing jaws with sealing dies onto opposite sides of said tube to seal an area across said tube and also having means for moving said tube and said die relative to each other to move from the bottom seal of the bag to the top seal of the bag at the bottom of the next successive bag, comprising:
 (a) opposed gusset-forming means on opposite sides of said tube between said heat sealing jaws and opposing each other on opposite sides of said tube from a direction to move substantially perpendicular to the line of motion of said sealing jaws as they close to seal,
 (b) said means in (a) including gusset-tucker fold members on said jaws connected to be actuated by the jaws,
 (c) each of said fold members comprising a sheet of plastic material having hinge lines thereon defining a center fold portion and side fold portions,
 (d) said side fold faces and said center fold face moving relative to each other and the center of one closing on the center face on the opposite side as said jaws close to create a gusset-fold with folded sides on each side of the bag.

12. In an apparatus for forming gussets on a form and fill machine wherein said machine includes a former and sealer for forming and sealing a continuously supplied web of material in a tubular formation filling same, moving opposed heat sealing dies onto opposite sides of said tube to seal an area across said tube there being means to cut said bags apart and means for moving said tube and said die relative to each other to move from the bottom seal of the bag to the top seal of the bag at the bottom of the next successive bag comprising:
 (a) opposed gusset-forming means on opposite sides of said tube between said heat sealing jaws and opposing each other on opposite sides of said tube from a direction to move substantially in the direction of the plane of the seal on the bag,
 (b) said means in (a) including gusset-tucker fold members between corresponding end of said jaws to be actuated by the jaws,
 (c) each of said fold members comprising a sheet of material having straight hinge lines thereon defining a flat center fold portion and flat side fold portions that swing relative thereto,
 (d) said side fold portions and said center fold portion moving relative to each other toward and closing with respect to the side and center portions on the opposite side, as said jaws close,
 (e) said center fold portion creating a fold area in said bag extending into said bag and radiating from said seal, and said side portions folding the material of said bag from said center and substantially on itself to form together a defined gusset.

13. In an apparatus for forming indentions on the sides of bags made on a form and fill machine wherein said machine includes a former for forming a continuously supplied web of film or sheet material into a tubular formation and for moving heat sealing dies or jaws onto opposite sides of said tube to seal an area across said tube, cutting means to separate the bags; and also having means for moving said tube and said dies or jaws relative to each other to move from the bottom seal of one bag to the top seal of that same bag and the bottom of the next successive bag, comprising:

(a) indention forming members mounted on opposite sides of said tube and opposing each other on opposite ends of the jaws from a direction substantially along the direction of the face of said sealing jaws, said members being mounted to close against opposite sides of the tube, (b) means on said machine for actuating said members in (a) in squence with the closing of said jaws so that said means contacts said tube prior to said jaws closing, (c) and control means on said machine for said means in (b) to cause said members in (a) to form the indented portions prior to the closing of said jaws and to maintain said portions until said jaws close to seal said bags.

14. The device in claim 13, wherein:

(d) said members in (a) contact said tube at a position in relation to said jaws and with sufficient indentation in said tube to cause said indentions to extend both from the top of one bag to the bottom of the other.

References Cited

UNITED STATES PATENTS

| | | | |
|---|---|---|---|
| 1,937,501 | 12/1933 | Aldrich | 53—182 X |
| 2,555,758 | 6/1951 | Nobel et al. | 53—180 |
| 2,605,597 | 8/1952 | Schieb | 53—182 |
| 2,917,879 | 12/1959 | Aubin | 53—180 X |
| 3,006,121 | 10/1961 | Omori | 53—180 |
| 3,008,278 | 11/1961 | McCalley | 53—182 |
| 3,201,913 | 8/1965 | Kopp | 53—182 |

TRAVIS S. McGEHEE, *Primary Examiner.*

FRANK E. BAILEY, *Examiner.*

A. E. FOURNIER, S. ABEND, N. ABRAMS,
*Assistant Examiners.*

Disclaimer 3,353,327.—*Duncan B. Cutler*, *William L. Warner* and *William A. Hadden*, De Kalb County, Ga. GUSSET APPARATUS FOR BAG FORM AND FILL MACHINE AND METHOD. Patent dated Nov. 21, 1967. Disclaimer filed Dec. 8, 1970, by the assignee, *The Woodman Company, Inc.*

Hereby enters this disclaimer to claims 1, 2 and 4 of said patent.

[*Official Gazette April 29, 1975.*]